US008020761B2

(12) United States Patent
Lum

(10) Patent No.: US 8,020,761 B2
(45) Date of Patent: Sep. 20, 2011

(54) POINT-OF-SALE TERMINAL SYSTEM WITH INTEGRATED RF CARD READER AND INTERCHANGEABLE BASE

(75) Inventor: Jackson Lum, Roslyn, NY (US)

(73) Assignee: Logic Controls, Inc., New Hyde Park, NY (US)

( * ) Notice: Subject to any disclaimer, the term of this patent is extended or adjusted under 35 U.S.C. 154(b) by 799 days.

(21) Appl. No.: 11/682,572

(22) Filed: Mar. 6, 2007

(65) Prior Publication Data

US 2007/0241184 A1 Oct. 18, 2007

Related U.S. Application Data

(63) Continuation-in-part of application No. 11/241,735, filed on Sep. 30, 2005, now Pat. No. 7,654,446.

(60) Provisional application No. 60/779,566, filed on Mar. 6, 2006.

(51) Int. Cl.
*G06K 5/00* (2006.01)

(52) U.S. Cl. .................... 235/380; 235/379; 235/462.12

(58) Field of Classification Search .................. 235/379, 235/380, 381, 382.5, 383, 462.12, 472.02; 705/4, 16

See application file for complete search history.

(56) References Cited

U.S. PATENT DOCUMENTS

| | | | | |
|---|---|---|---|---|
| 5,594,920 | A | 1/1997 | Ebina et al. | |
| 5,707,162 | A | 1/1998 | Kasai et al. | |
| 5,745,341 | A * | 4/1998 | Wolff et al. | 361/679.26 |
| 5,794,214 | A | 8/1998 | Ebina et al. | |
| 5,808,283 | A | 9/1998 | Stanton et al. | |
| 5,878,211 | A * | 3/1999 | Delagrange et al. | 726/34 |
| 5,941,618 | A * | 8/1999 | Cheng | 312/223.2 |
| 6,003,008 | A | 12/1999 | Postrel et al. | |
| 6,053,410 | A | 4/2000 | Wike, Jr. et al. | |
| 6,053,412 | A | 4/2000 | Wike, Jr. et al. | |
| 6,065,677 | A * | 5/2000 | Lippert et al. | 235/462.43 |
| 6,705,520 | B1 | 3/2004 | Pitroda et al. | |
| 6,729,242 | B2 | 5/2004 | Kerber | |
| 6,769,607 | B1 | 8/2004 | Pitroda et al. | |
| 7,654,446 | B2 | 2/2010 | Lum | |
| 2002/0153414 | A1 | 10/2002 | Stoutenburg et al. | |
| 2002/0156683 | A1 * | 10/2002 | Stoutenburg et al. | 705/16 |
| 2003/0132292 | A1 | 7/2003 | Gomez et al. | |

(Continued)

OTHER PUBLICATIONS

TOM-XV Series, 15" LCD Touchmonitor, Pioneerpos, Inc., p. 1 (2004).

AIO-XV Series, 15" All-in-One Touchscreen System, Pioneerpos, Inc., p. 1 (2004).

PXI Series, All-in-One Touch System, Pioneerpos, Inc., p. 1 (2004).

(Continued)

*Primary Examiner* — Karl D. Frech

(74) *Attorney, Agent, or Firm* — Hoffmann & Baron, LLP

(57) ABSTRACT

A point-of-sale system includes a housing, processing device, and radio frequency card reader. The processing device and reader are disposed within the housing, which eliminates external electrical connections associated with the reader. The system may include a monitor and an interchangeable base, which receives the monitor and is selectively removable from the monitor. The interchangeable base houses the processing device. The housing may include the interchangeable base, which also houses electrical connections associated with the RF card reader. A method of displaying point-of-sale information includes providing a housing, disposing a processing device within the housing, and disposing a radio frequency card reader within the housing, thereby eliminating external electrical connections associated with the reader. The method may include providing a monitor with a display and receiving area, adapting the interchangeable base to receive the receiving area and to be selectively removable from the receiving area.

16 Claims, 14 Drawing Sheets

U.S. PATENT DOCUMENTS

| | | | |
|---|---|---|---|
| 2004/0059634 | A1 | 3/2004 | Tami et al. |
| 2004/0159699 | A1 | 8/2004 | Nelson et al. |
| 2004/0164863 | A1 | 8/2004 | Fallin et al. |
| 2004/0172276 | A1 | 9/2004 | Kamo |
| 2004/0172339 | A1 | 9/2004 | Snelgrove et al. |
| 2004/0181453 | A1 | 9/2004 | Ray et al. |
| 2008/0023612 | A1 | 1/2008 | Lum |

OTHER PUBLICATIONS

JIVA 5800, Thick-Client Terminal Solutions, Posiflex Business Machines, Inc., pp. 1-4 (2002).

NCR RealPOS™ 62 Workstation, NCR Corporation, pp. 1-2 (2003).

Beetle POS Family Beetle/iPOS, Wincor Nixdorf International GmbH, pp. 1-2 (2003).

* cited by examiner

POINT-OF-SALE TERMINAL SYSTEM WITH INTEGRATED RF CARD READER AND INTERCHANGEABLE BASE

CROSS REFERENCE TO RELATED APPLICATIONS

This application claims the benefit of U.S. Provisional Application No. 60/779,566 filed on Mar. 6, 2006, and is a continuation-in-part of U.S. application Ser. No. 11/241,735 filed on Sep. 30, 2005 now U.S. Pat. No. 7,654,446, the disclosures of which are incorporated herein by reference.

BACKGROUND OF THE INVENTION

1. Field of the Invention

The present invention generally relates to point-of-sale (POS) terminal systems, and more particularly to integrating a radio frequency (RF) card reader and providing interchangeable bases for a POS terminal system.

2. Description of the Related Art

Point-of-sale (POS) terminal systems are commonly used in retail stores, supermarkets, and restaurants for sales transactions. In a typical POS terminal system, popular components include a cash drawer, printer, credit card reader, bar code reader, monitor, customer display, POS keyboard, touch screen monitor, signature verifier, and computer.

However, in most POS customer service areas, counter space is limited. Therefore, although it is advantageous to integrate several components into one compact unit, a high degree of integration has at least one drawback. Specifically, different components have different usable life spans. Therefore, a single outdated component can render the entire system obsolete even if the remaining components are perfectly functional and up-to-date. In an integrated POS terminal system, the computer provides an excellent example of a component that is readily outdated.

A radio frequency (RF) card is also known as a contactless credit card and operates on the principle of radio frequency identification technology. For example, an RF card reader radiates a radio frequency signal that is received by an antenna in the RF card. Data is exchanged when the card is within the RF field of the reader antenna. The RF card derives its power from the RF card reader signal and does not require a battery or external power source. A complete line of contactless RF card products in wafer and module form is available from Atmel Corporation, 2325 Orchard Parkway, San Jose, Calif. 95131. With the addition of an external antenna to these commercially available components a complete RFID tag of RF card may be manufactured by means well known in the art.

The received signal generates enough electrical power to activate the electronics of the RF card. The RF card then transmits its unique identification back to the card reader. With the proper security encryption, the card reader deciphers data on the card and converts this data into standard magnetic stripe reader data. This type of RF card and card reader offer the advantages of higher security, faster reading, and more convenient processing when compared with conventional magnetic stripe cards and the corresponding card readers.

As a result, RF card readers are gaining popularity. Rather than replacing conventional magnetic stripe readers by the much anticipated Smart Cards, many applications plan to adopt the RF card instead. The advantages of the RF card include:

1. an output format that is compatible with that of magnetic stripe readers, which enables traditional credit check systems to be preserved;

2. rapid reading of information on the RF card;

3. high security;

4. the ability of the card holder to physically retain the RF card while it is being read;

5. lower manufacturing costs when compared with Smart Cards;

6. lack of physical wear caused by reading, which would require issuance of a new card as is done with conventional credit cards that are swiped;

7. high success rate for initial reads; and 8. reading is independent of the RF card orientation with respect to the card reader.

A conventional POS terminal system 30, in which each of the components is integrated into a single assembly, is shown in FIG. 1. The display is often a touch screen Liquid Crystal Display (LCD) 32. The electronics required to power and drive the touch screen monitor 32 are generally housed behind the display 16.

An important component of the integrated terminal system 30 is the computer (not shown). In FIG. 1, the computer is located either inside a base 34 or in a rear portion of the terminal housing 36. In either case, the computer is an integral part of the system and it is not separable from the remaining assembly to enable the computer to be, for example, upgraded to a more powerful computer.

Thus, there is a need in the field of POS terminal systems for an alternative that would provide the advantages of conventional integrated POS terminal systems, which include many essential components, such as an RF card reader, while addressing the limitation of rendering an entire system obsolete with a single outdated component, such as the computer. In addition, there is a need to improve flexibility in customizing the features of an integrated POS terminal system.

SUMMARY OF THE INVENTION

These and other goals, purposes, and objectives are met by the present invention that provides a point-of-sale system, which include a housing, a processing device, and a radio frequency (RF) card reader. The processing device and the RF card reader are disposed or at least partially disposed within the housing, thereby eliminating electrical connections associated with the RF card reader that are external to the housing. The system may also include a monitor, and an interchangeable base, which may be one of a plurality of interchangeable bases adapted to fit various monitors. The interchangeable base may be adapted to receive the monitor and is selectively removable from the monitor. The interchangeable base may be adapted to house the processing device. The housing may include the interchangeable base that is adapted to house electrical connections associated with the RF card reader.

The system may also include a magnetic strip reader (MSR), customer display, touch-screen display, speaker, fingerprint verifier, printer, bar code reader, cash drawer, keyboard, flash-based mass storage, disk drive mass storage, memory, Universal Synchronous Bus (USB) port, RS-232 port, SVGA port, Ethernet port, parallel port, PS/2 port, audio port, programmable cash drawer kickout port, and/or mouse operatively coupled to the processing device. The RF card reader may be positioned in proximity to the customer display, such that the RF card reader can be accessed while viewing the customer display.

The present invention further provides a point-of-sale monitor, which includes a housing, a display and a radio frequency (RF) card reader fully or partially disposed within the housing, thereby eliminating electrical connections associated with the RF card reader that are external to the housing. The monitor may include a receiving area, which is adapted to be received by one or more interchangeable base. The receiving area may be adapted to be selectively removable from the interchangeable base. The RF card reader may be disposed fully or partially within the interchangeable base.

The present invention yet further provides a plurality of interchangeable bases adapted for use in a point-of-sale system, at least one of which includes a receiving area adapted to receive a monitor, and a mounting device adapted to removably attach the interchangeable base to the monitor. The interchangeable bases may be adapted to house a processing device, which includes a computer, microprocessor, microcontroller, application specific integrated circuit (ASIC), and/or programmable logic device. The interchangeable bases may be adapted to house electrical connections associated with a monitor.

The present invention still further provides a method of displaying point-of-sale information, which includes providing a housing, disposing a processing device fully or partially within the housing, and disposing a radio frequency (RF) card reader fully or partially within the housing, thereby eliminating electrical connections associated with the RF card reader that are external to the housing. The method may also include providing a monitor comprising a display and a receiving area, adapting an interchangeable base to receive the receiving area, and adapting the interchangeable base to be selectively removable from the receiving area.

The method may include adapting least the interchangeable base to house the processing device, providing the processing device as a computer, microprocessor, microcontroller, application specific integrated circuit (ASIC), and/or programmable logic device, and/or adapting the interchangeable base to house electrical connections associated with the RF card reader. The method may further include coupling a magnetic strip reader (MSR), customer display, touch-screen display, speaker, fingerprint verifier, printer, bar code reader, cash drawer, keyboard, flash-based mass storage, disk drive mass storage, memory, Universal Synchronous Bus (USB) port, RS-232 port, SVGA port, Ethernet port, parallel port, PS/2 port, audio port, programmable cash drawer kickout port, and/or mouse operatively to the processing device. The method may include positioning the RF card reader in proximity to a customer display, such that the RF card reader can be accessed while viewing the customer display.

These and other objectives, features, and advantages of this invention will become apparent from the following detailed description of illustrative embodiments thereof, which is to be read in connection with the accompanying drawings.

DETAILED DESCRIPTION OF THE PREFERRED EMBODIMENTS

Figure 1:
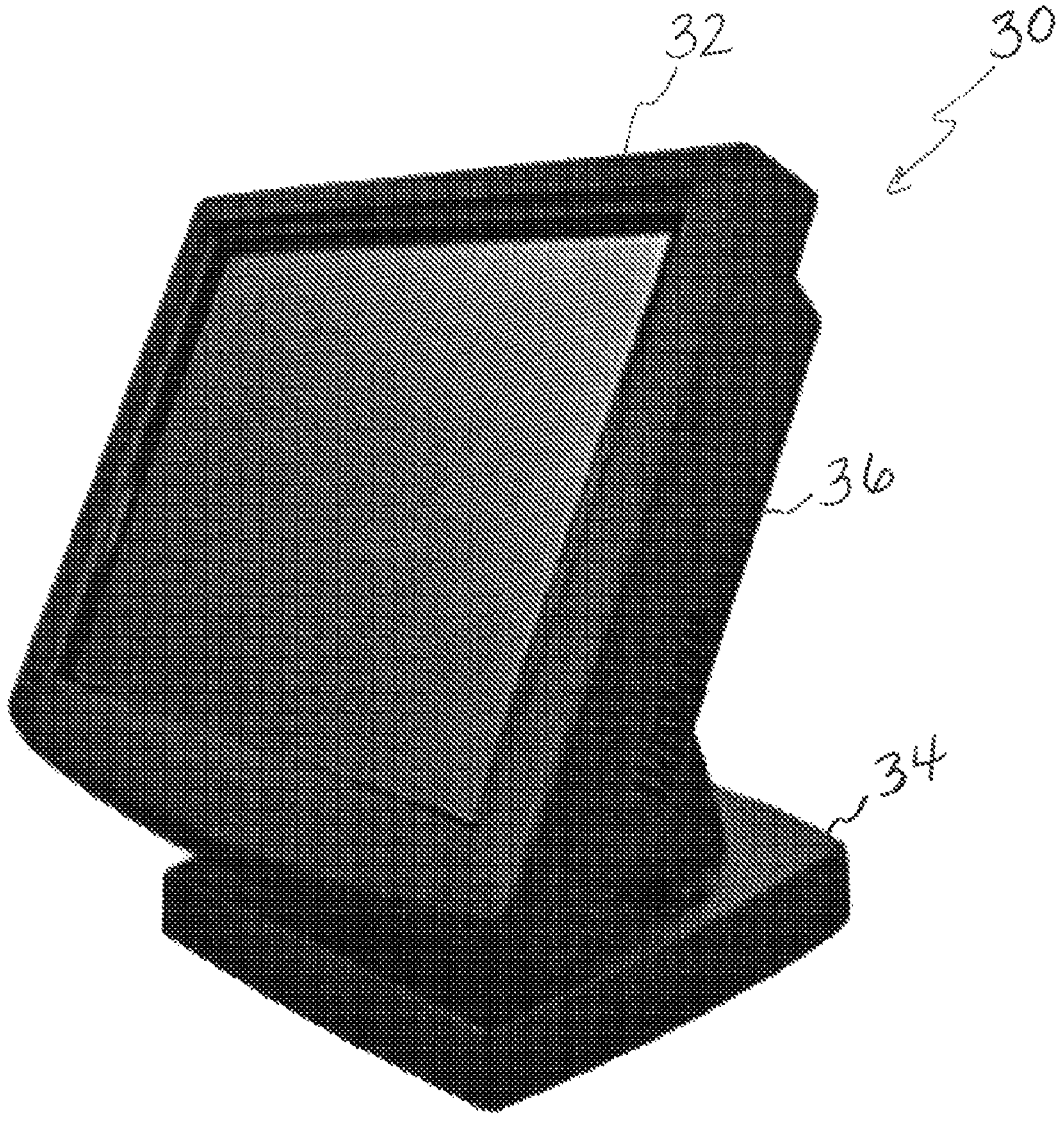
FIGURE 1 PRIOR ART
FIG. 1 is a perspective view of a conventional point-of-sale integrated terminal system.
Figure 2:
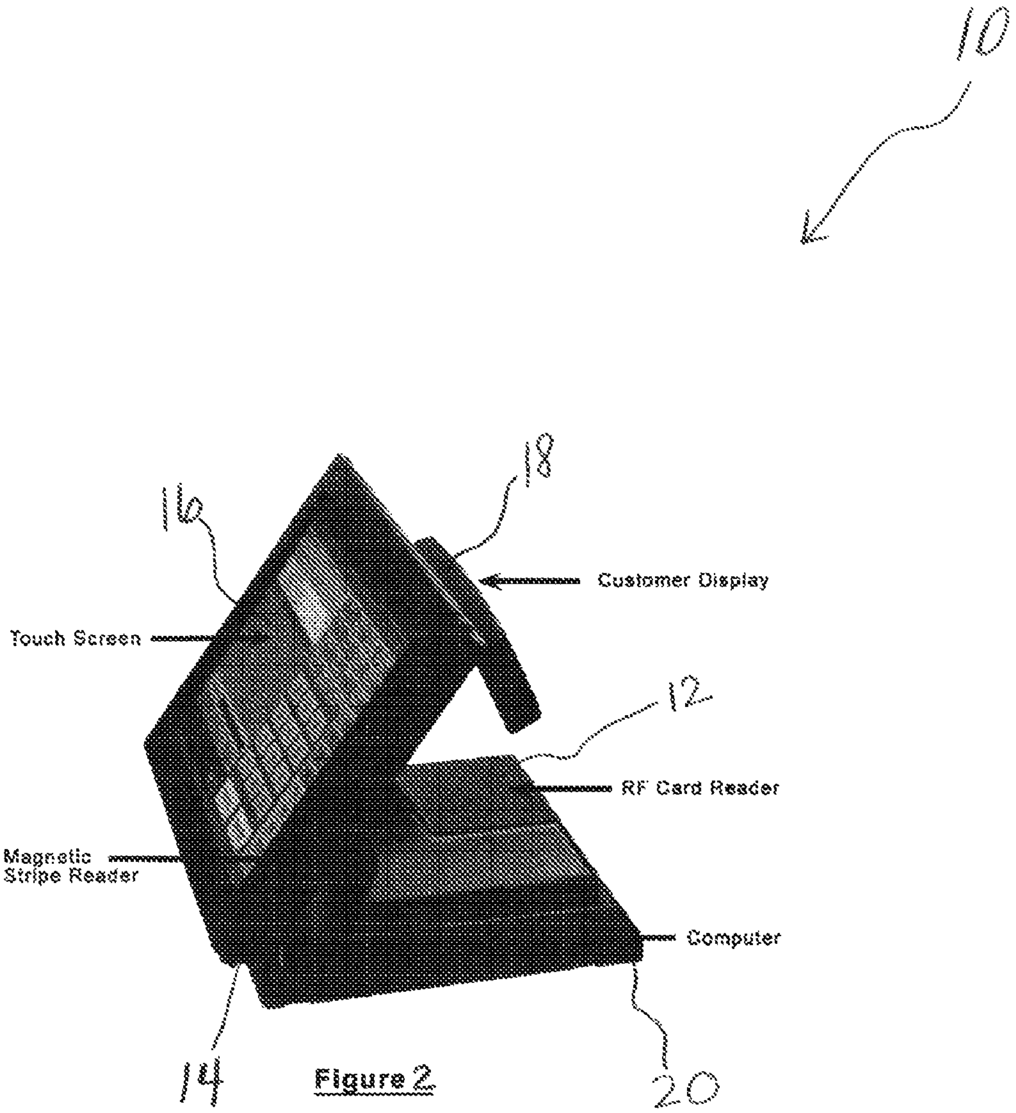
FIG. 2 is a perspective view of an all-in-one point-of-sale integrated terminal system in accordance with the present invention.
Figure 3:
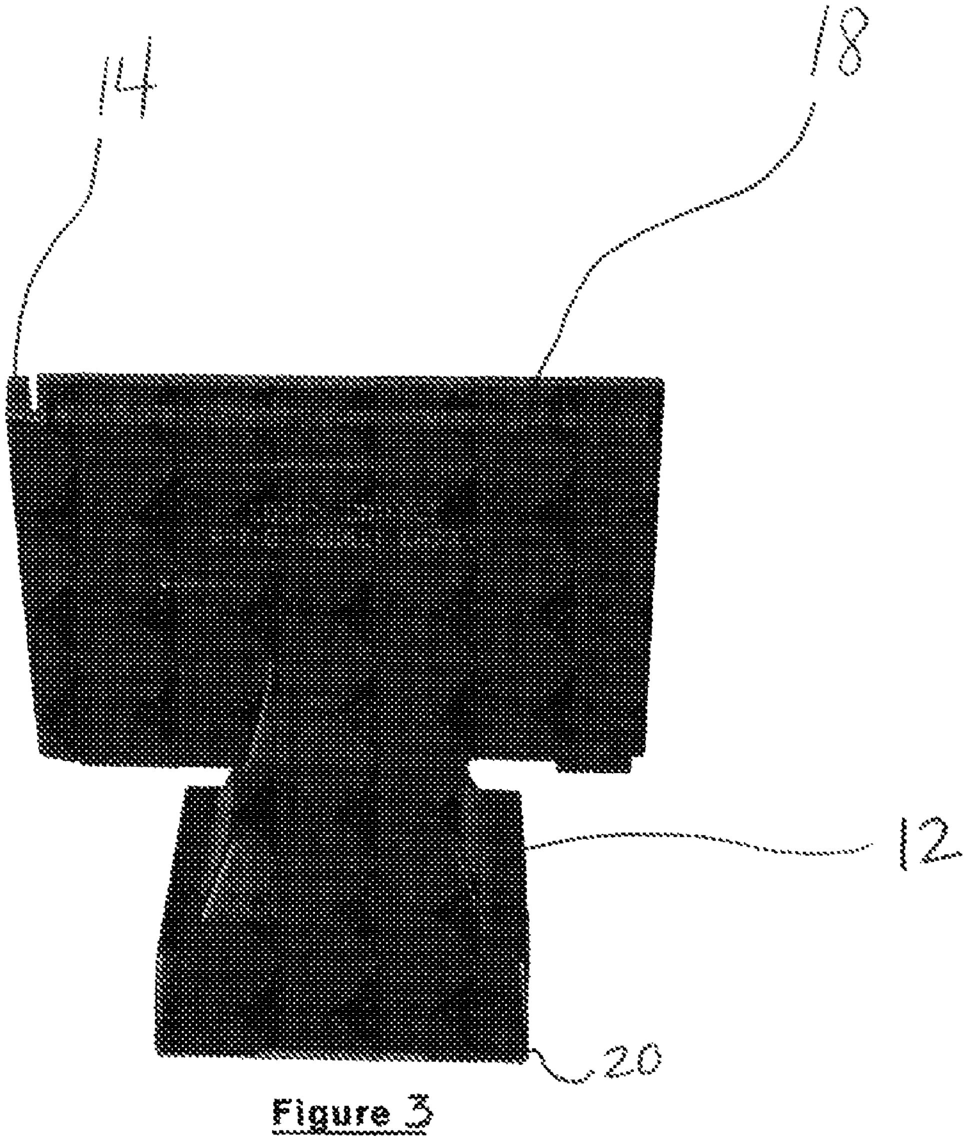
FIG. 3 is a rear view of the all-in-one point-of-sale integrated terminal system.
Figure 4:
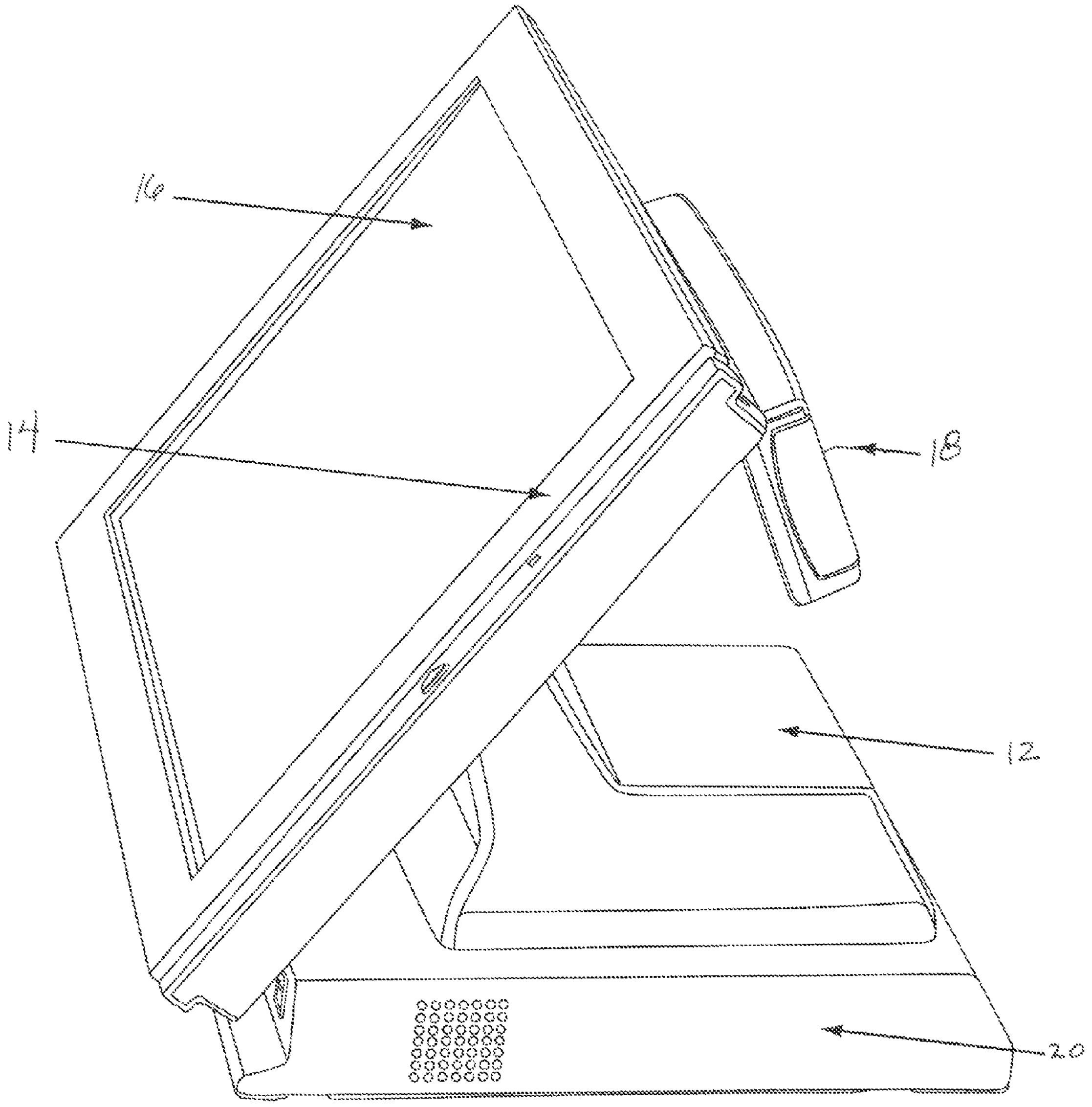
FIG. 4 is a side perspective view of the all-in-one point-of-sale integrated terminal system.
Figure 5:
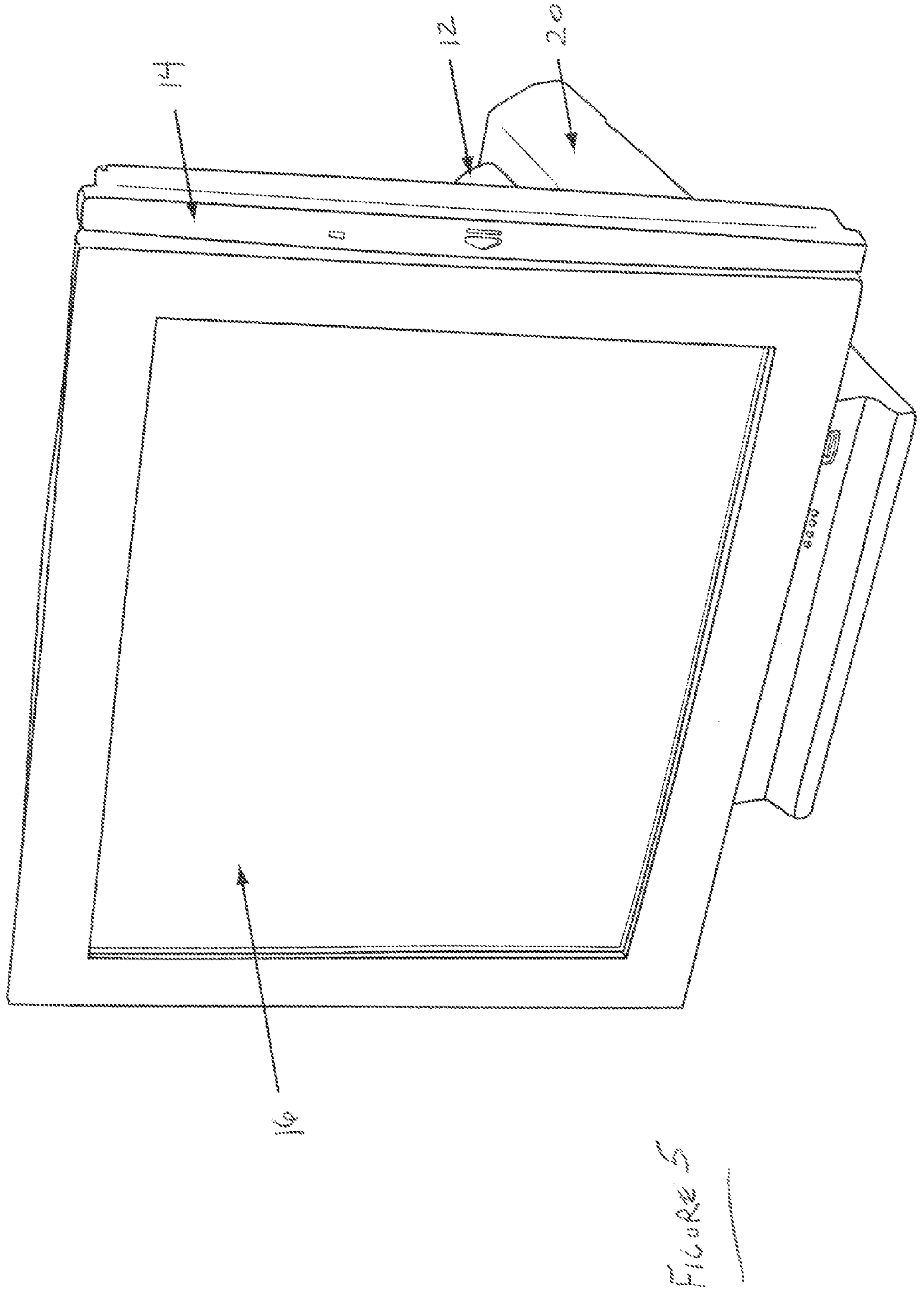
FIG. 5 is a front perspective view of the all-in-one point-of-sale integrated terminal system.
Figure 6:
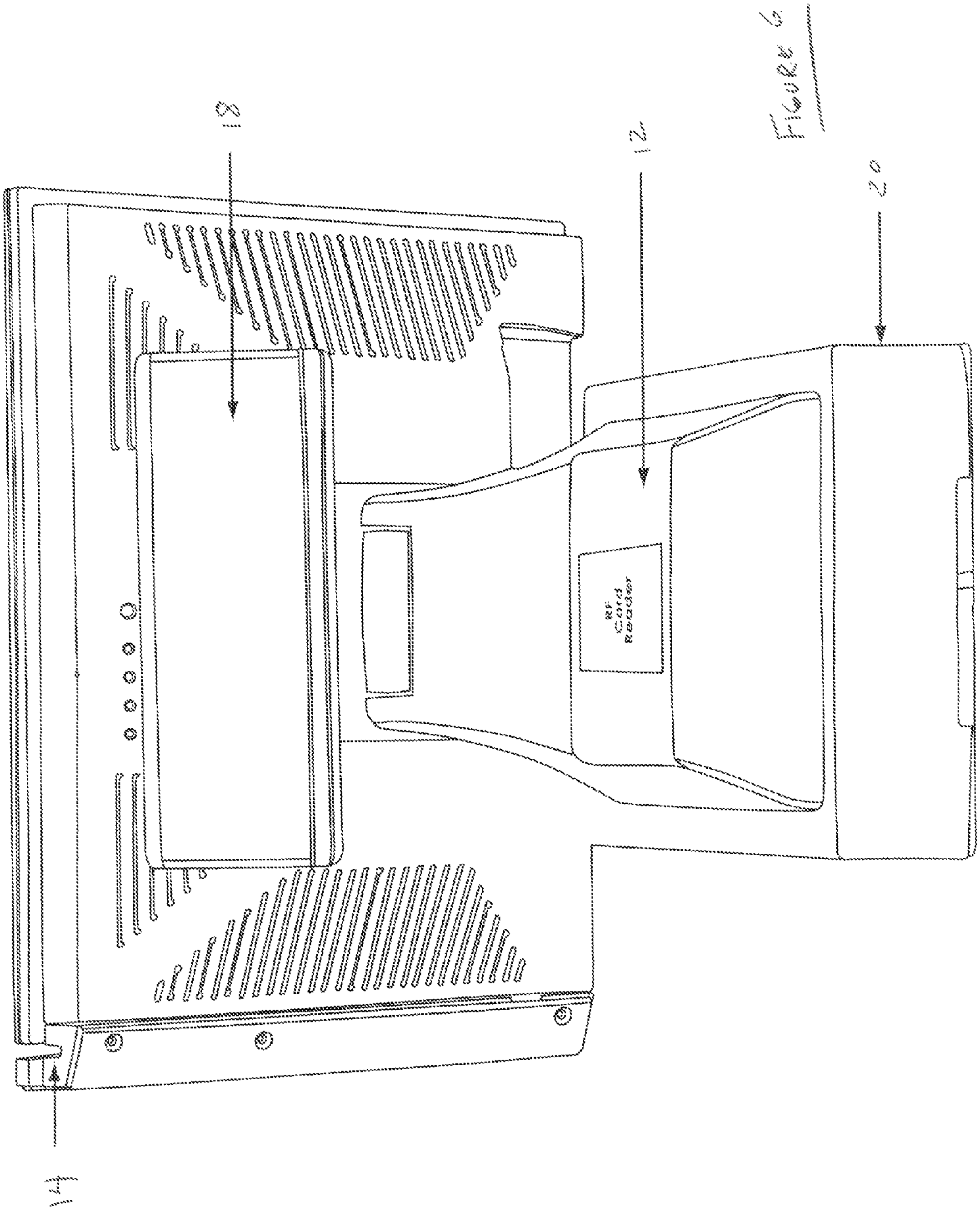
FIG. 6 is a rear view of the all-in-one point-of-sale integrated terminal system.

In accordance with the present invention, FIGS. 2-6 show various views of an integrated point-of-sale (POS) terminal system 10 with a radio frequency (RF) card reader 12 in accordance with a first embodiment of the present invention. The terminal system 10 preferably also includes a magnetic stripe reader 14, touch screen display 16, customer display 18, and a computer 20. Accordingly, the terminal system 10 provides displays for both a cashier and a customer.

Although the RF card reader 12 is shown as being preferably mounted on a rear internal surface of the terminal system 10, the RF card reader 12 could as well be mounted anywhere in or on the terminal system 10 while remaining within the scope of the present invention. The RF card reader 12 is preferably mounted at a location that is easily accessible to customers using the terminal system 10. The RF card reader 12 is commercially available as model number UIC 680 contactless module from Uniform Industrial Corp., 47709 Fremont Blvd., Fremont, Calif. 94538.

The RF card reader is also preferably enclosed within the terminal system 10, such that any visible external interface cables are not required. In addition, the RF card reader 12 is preferably fixed at a position on the terminal system 10 that will not be in proximity with any metallic objects since such proximity reduces the sensitivity of the RF card reader 12. The RF card reader 12 is also preferably positioned in proximity to the customer display 18, which preferably shows information including the status of the RF card being read, the payment tendered, and the balance remaining on the RF card following the current transaction.

Output from the RF card reader 12 is preferably connected to and processed by the computer 20. The RF card reader 18 is preferably powered by a power supply (not shown) of the terminal system 10, but may be powered by any means known in the art.

Thus, the terminal system 10 in accordance with the present invention may provide one or more the following features:

1. a built-in integrated RF card reader;
2. a fanless computer, as disclosed in further detail in U.S. application Ser. No. 10/662,120, which is incorporated herein by reference.

3. a small footprint;

4. a detachable base unit, as disclosed in further detail in U.S. application Ser. No. 11/241,735, which is incorporated herein by reference;

5. ease of service;

6. ruggedness and reliability of design;

7. additional peripherals and components, such as integrated WiFi capability (such as be incorporating a WiFi adapter by means well known in the art), built-in magnetic stripe reader, a customer display (such as a touch-screen display), speakers, HDD and/or flash-based mass storage, RAM, I/O ports (USB, RS-232, SVGA, Ethernet, parallel, PS/2 keyboard/mouse, audio, power USB, and programmable cash drawer kickouts).

9. the option of not having internal moving parts by selecting the appropriate components; and 10. multimedia ready (MPEG-2 decoding and video).

Since the terminal system 10 is preferably a fanless units, it is highly suitable for retail or hospitality environments where dust and/or grease may be present or when fan noise is not desirable. For enhanced reliability, the single board computer of the terminal system 10 preferably limits the number of internal cables, which is a common source of loose connections and failure. A true no-moving parts operation is provided when compact flash is used for mass storage or boot-from-network operation is provided.

The terminal system 10 preferably provides a high-quality, bright 15" touch-screen display (which is typically 15", but may be larger or smaller while remaining within the scope of the present invention) with ample room for screen display and navigation. The display preferably includes hardened anti-glare coatings and a high contrast for applicability in any POS environment. Since counter space is very limited in most retail and hospitality stores, the terminal system 10 preferably has a small footprint. The terminal system 10 preferably also includes two front-accessible USB 2.0 ports, special multimedia functionality, built-in speakers for computer-based training, and the capability to boot from a network or USB flash drive.

Figure 7:
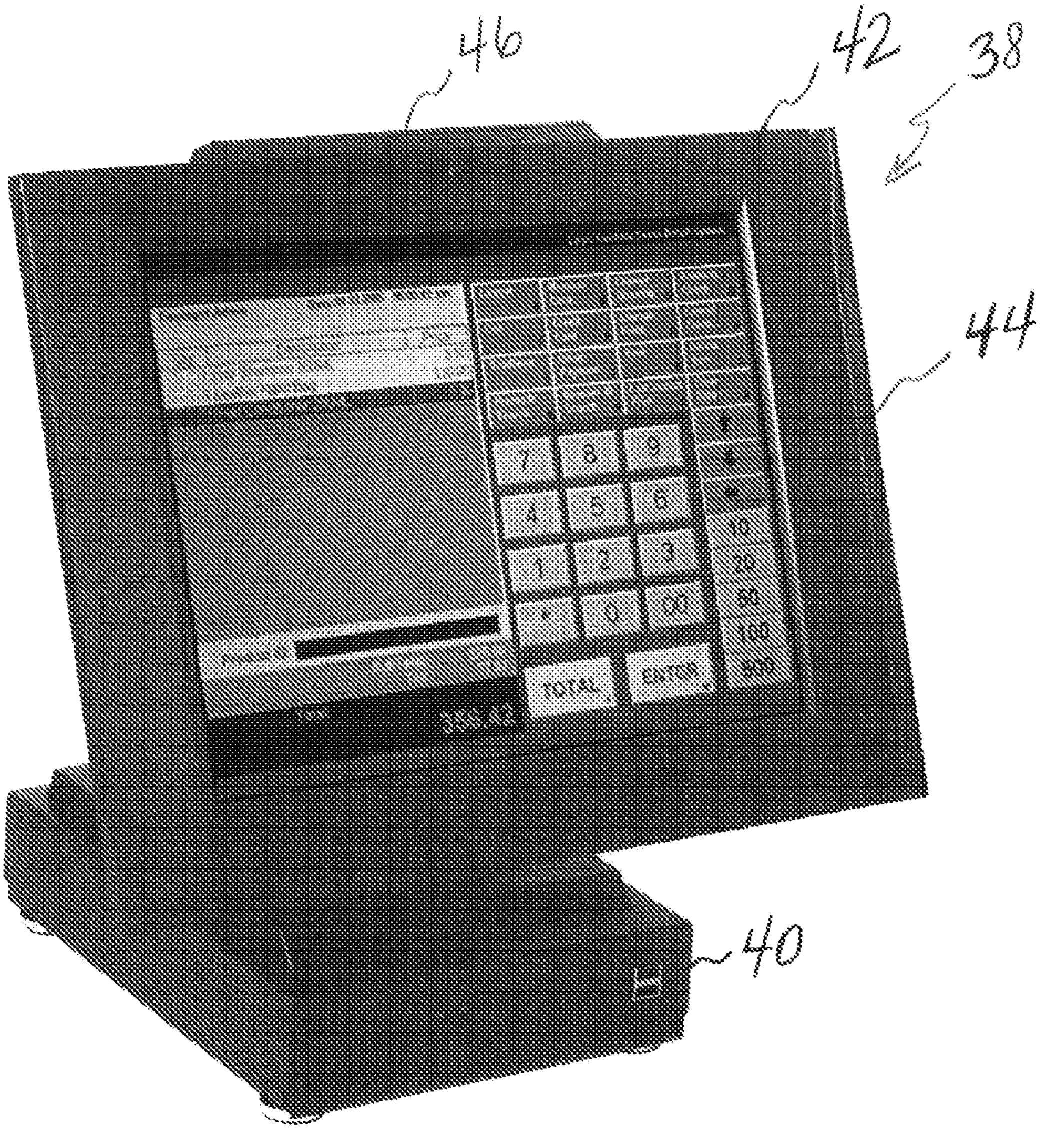
FIG. 7 is a perspective view of an integrated terminal system with an interchangeable base in accordance with the present invention.

In accordance with a second embodiment of the present invention, which may be combined with the features of the first embodiment while remaining within the scope of the present invention, FIG. 7 shows an integrated point-of-sale (POS) terminal system 38 with a removable and/or interchangeable computer base 40. An upper section of the system 38 preferably includes a touch screen LCD monitor 42, a credit card reader 44 which is preferably located on the right-hand side of the monitor 42, and a customer display 46, which is preferably mounted on the rear side of the LCD monitor and is only partially visible near the top of the monitor 42.

Figure 8:
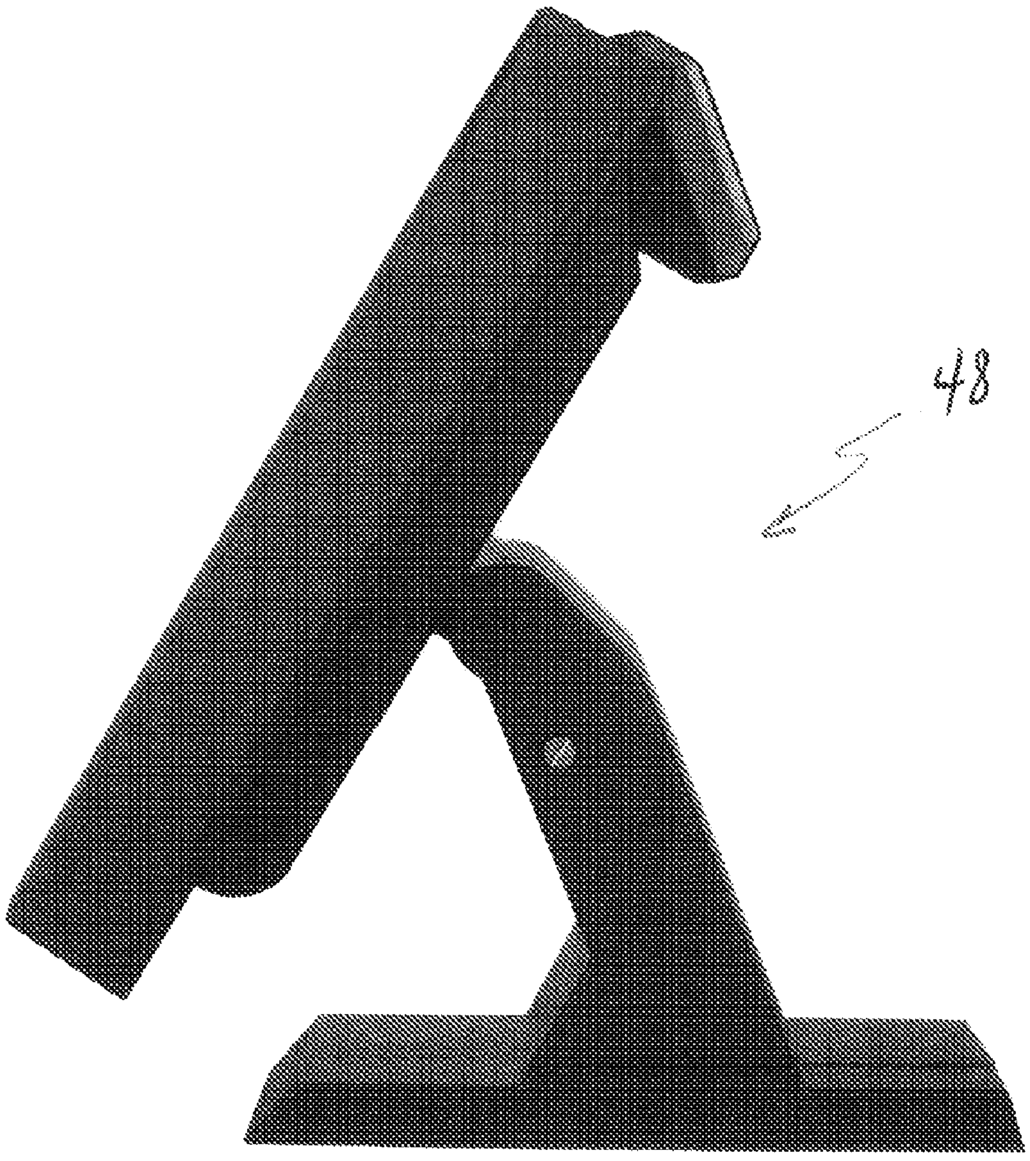
FIG. 8 is a side view of a monitor shown in FIG. 7.

The lower section of the system 38 includes the readily detachable computer housing or interchangeable base 40. The upper section 48 of the system 38 shown in FIG. 8, and the lower section 50 is shown in FIG. 9 detached from each other.

Figure 9:
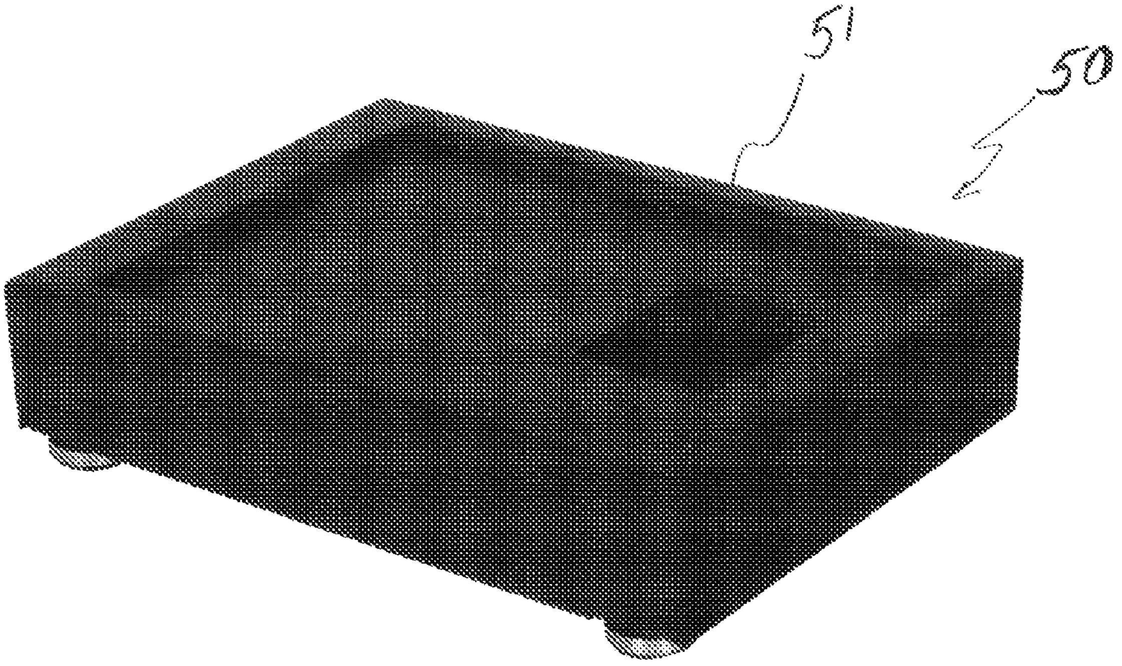
FIG. 9 is a perspective view of an interchangeable base shown in FIG. 7.
Figure 10:
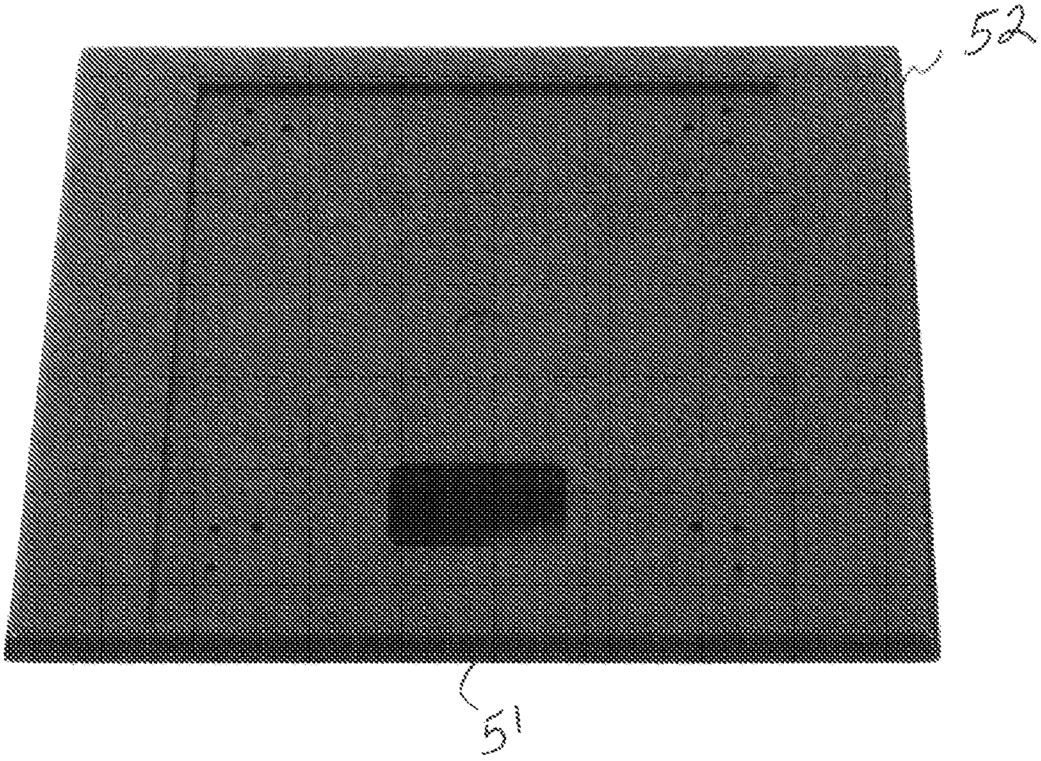
FIG. 10 is a perspective view of a second embodiment of the interchangeable base shown in FIG. 9.
Figure 11:
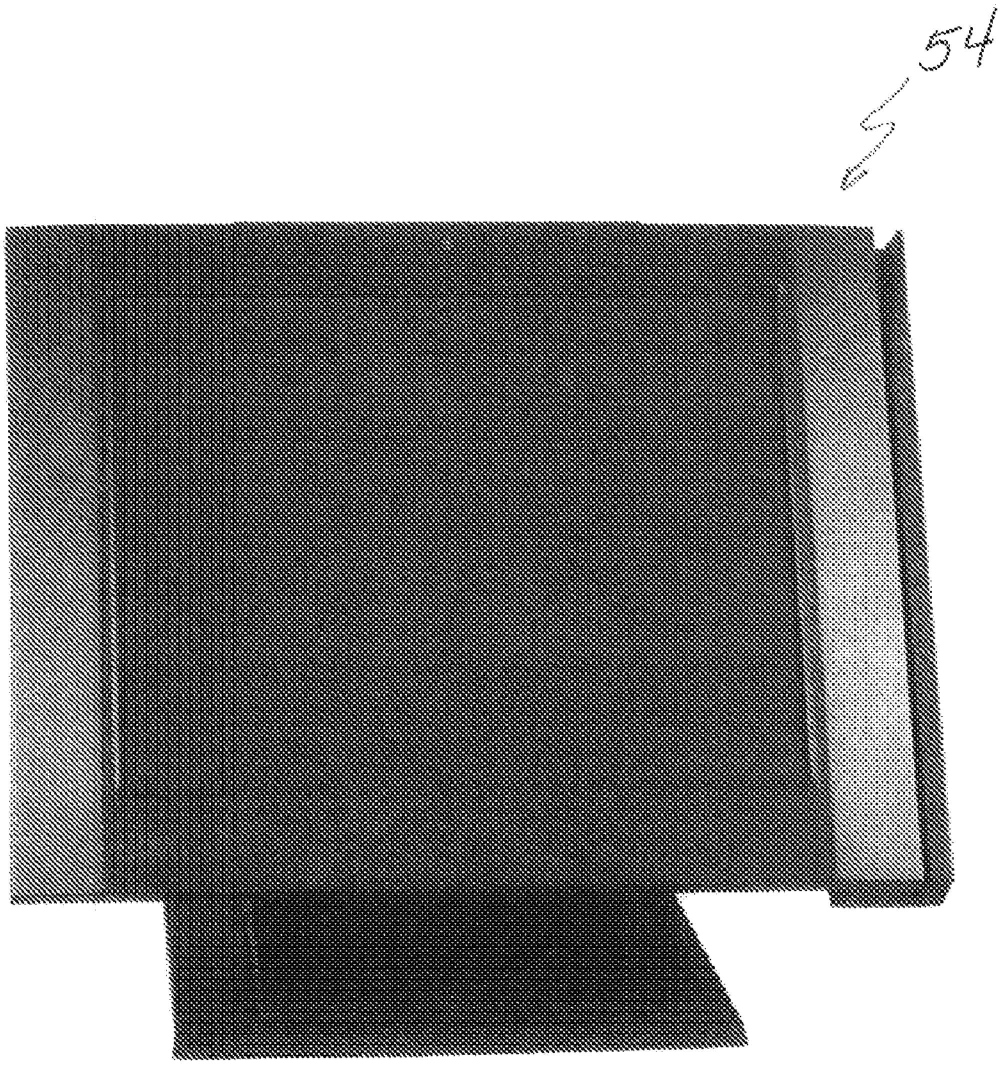
FIG. 11 is a perspective view of a second embodiment of the integrated terminal system with interchangeable base shown in FIG. 7.
Figure 12:
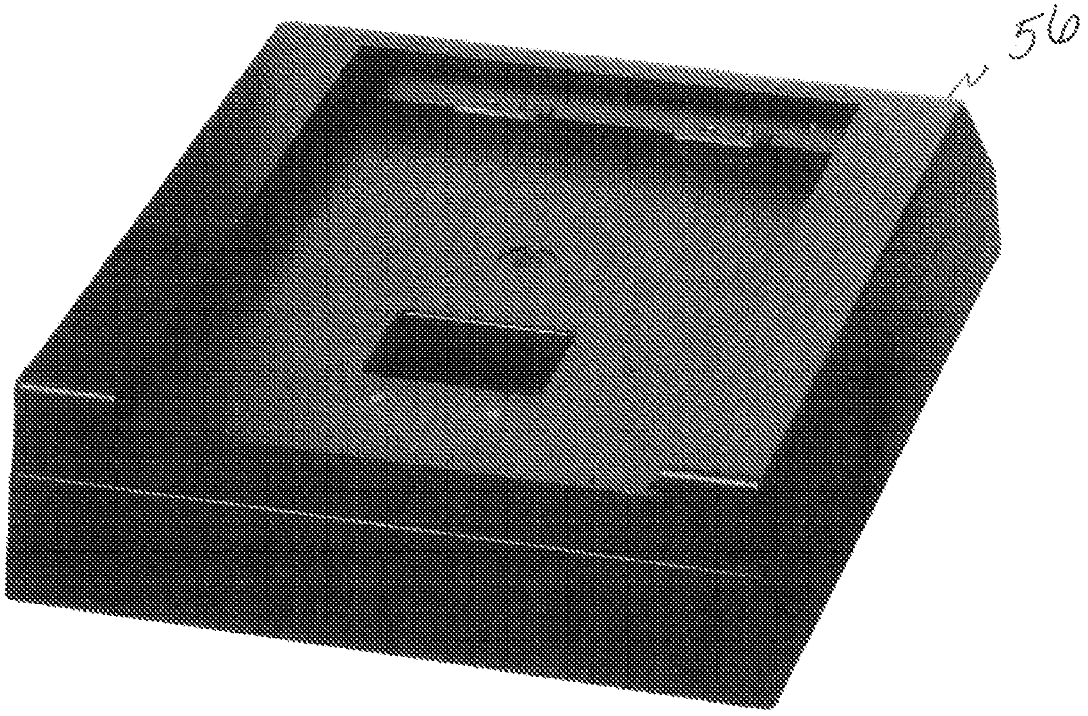
FIG. 12 is a perspective view of a third embodiment of the interchangeable base shown in FIG. 9.
Figure 13:
FIG. 13 is a perspective view of a third embodiment of the integrated terminal system with interchangeable base shown in FIG. 6.

The interchangeable base 40, which is preferably used to enclose the computer (not shown) is shown in FIG. 9 and can be replaced with different bases, such as those shown in FIGS. 10 and 12, to achieve different dimensions, functionality, and/or performance. For example, if a simple passive base 52 shown in FIG. 10 is used, a simple terminal system 54 shown in FIG. 11, which is a basic touch screen monitor 54, can be achieved. Alternatively, if a more powerful computer requires a larger active base 56 shown in FIG. 12, a high-performance terminal system 58 shown in FIG. 13 is achieved.

The interchangeable base 40 may incorporate an opening 51 to permit cabling and other connections to be made between the upper and lower sections of the POS terminal system or to merely enable the connections to pass through the interchangeable base 40. The interchangeable base 40 preferably performs the following functions:

1. It encloses a computer board, which is preferably used as a central processing unit (CPU) for the POS terminal system. The computer board or processing device preferably includes at least one of computer, microprocessor, microcontroller, application specific integrated circuit (ASIC), and/or programmable logic device.
2. It encloses and anchors all excess cables to the computer board from the monitor, magnetic strip reader (MSR), customer display, speakers, fingerprint verifier, printer, bar code reader, cash drawer, keyboard, mouse, and other peripherals that may be associated with and/or integrated in the POS terminal system.
3. It facilitates and simplifies the serviceability of the POS terminal system. Accordingly, by removing all the attached cables and only one or more screws, the entire computer unit can be detached for repair, upgrade or relocation.
4. Interface cables from the monitor and attached peripherals preferably enter the interchangeable base through the opening in the top surface of the base. Interface cables from other peripherals preferably enter the base through a bottom and/or rear opening (not shown).
5. The front side of the adapter base unit can support all the computer user interface functions, such as a power on/off switch, reset switch, power on indicator, hard drive activity indicator, beeper, and universal serial bus (USB) ports.

The interchangeable base is particularly advantageous since it substantially overcomes problems associated with variations in the useful life of different components integrated in the POS terminal system. For example, the user may upgrade or downgrade the computer associated with the terminal system while continuing to use the same touch screen monitor, which typically has a much longer usable life than the computer.

Figure 14:
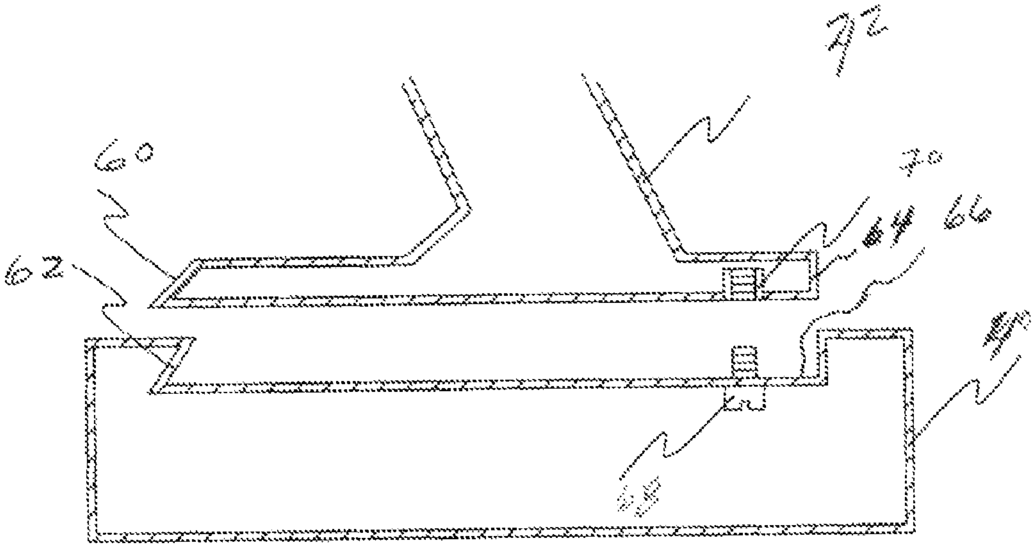
FIG. 14 is a side view showing a first embodiment of a method for mounting the monitor to the interchangeable base in accordance with the present invention.
Figure 15:
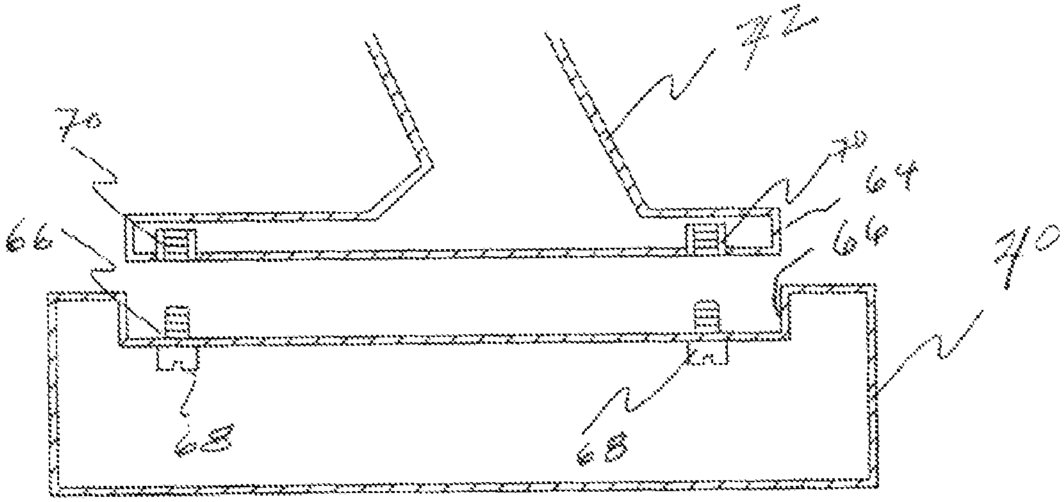
FIG. 15 is a side view showing a second embodiment of a method for mounting the monitor to the interchangeable base in accordance with the present invention.

Two embodiment of the methods for attaching the monitor 42 to the interchangeable base 40 are shown in FIGS. 14 and 15. In the embodiment shown in FIG. 14, a tapered base edge 60 of the monitor 42 is preferably slid into a tapered recess 62 in the interchangeable base 40. A front base portion 64 is then preferably lowered into a straight recess 66 in the interchangeable base 40. The monitor 42 and interchangeable base 40 are then preferably fastened together using a screw 68 and a mating nut 70. The first mounting method provides the minimum number of screws required to attach the monitor 42 to the interchangeable base 40.

Another embodiment is shown in FIG. 15, in which no tapered edges are used and the monitor 42 is placed into two straight recesses 66 in the interchangeable base 40. Two to four mounting screws 68 and nuts 70 are preferably used to attach the monitor 42 to the interchangeable base 40 in this embodiment. This embodiment provides the advantages of simplicity and lower cost in tooling.

Accordingly, the advantages provided by the integrated POS terminal system with the interchangeable base in accordance with the present invention include the following:

1. The system substantially reduces problems associated with obsolescence. For example, in the simplest configuration, the terminal system may be downgraded to a useful touch screen monitor with a simple passive base as shown in FIG. 11.
2. As future applications impose different requirements, such as a more powerful CPU, a different or larger base can be used, if required.

3. The interchangeable base can be redesigned to accommodate different footprints or styles to match and/or complement additional physical requirements, thus providing complete flexibility concerning variations in the shape, style, and/or dimensions of the system footprint.

Although illustrative embodiments of the present invention have been described herein with reference to the accompanying drawing, it is to be understood that the invention is not limited to those precise embodiments, and that various other changes and modifications may be affected therein by one skilled in the art without departing from the scope or spirit of the invention.

What is claimed is:

1. A point-of-sale system comprising:

a first monitor;

a plurality of interchangeable bases, the plurality of interchangeable bases being adapted to receive the first monitor, the plurality of interchangeable bases being adapted to be selectively removable from the first monitor to permit the first monitor to be used with any one of the plurality of interchangeable bases, the plurality of interchangeable base units including a processing device having a different performance level for performing point-of sale operations, wherein the plurality of interchangeable bases are interchangeably connectable to a monitor based on performance requirements of the point-of-sale system;

a processing device disposed within the housing;

a radio frequency (RF) card reader, the RF card reader being disposed within the housing, thereby eliminating electrical connections associated with the RF card reader that are external to the housing; and a second monitor, the second monitor being disposed on a rear portion of the first monitor.

2. The point-of-sale system defined by claim 1, wherein each of the plurality of interchangeable bases includes a housing , the housing being adapted to house electrical connections associated with the RF card reader.

3. The point-of-sale system defined by claim 1, further comprising at least one of a magnetic strip reader (MSR), customer display, touch-screen display, speaker, fingerprint verifier, printer, bar code reader, cash drawer, keyboard, flash-based mass storage, disk drive mass storage, memory, Universal Synchronous Bus (USB) port, RS-232 port, SVGA port, Ethernet port, parallel port, PS/2 port, audio port, programmable cash drawer kickout port, and mouse operatively coupled to the processing device.

4. The point-of-sale system defined by claim 1, wherein the second monitor comprises a customer display and the RF card reader is positioned in proximity to the customer display, such that the RF card reader can be accessed while viewing the customer display.

5. A point-of-sale monitor comprising:

a housing;

a display disposed within the housing; and a radio frequency (RF) card reader disposed within the housing, thereby eliminating electrical connections associated with the RF card reader that are external to the housing, wherein the housing is selectively receivable by each of a plurality of interchangeable bases, each of the plurality of interchangeable bases being selectively removable from the housing to permit the point-of-sale monitor to be used with any one of the interchangeable bases, the plurality of interchangeable base units including a processing device having a different performance level for performing point-of sale operations, wherein the plurality of interchangeable bases are interchangeably connectable to a monitor based on performance requirements of the point-of-sale system.

6. The point-of-sale monitor defined by claim 5, wherein the monitor further comprises a receiving area, the receiving area being adapted to be received by an interchangeable base, the receiving area being adapted to be selectively removable from the interchangeable base.

7. A plurality of interchangeable bases adapted for use in a point-of-sale system, each of the plurality of interchangeable bases comprising:

a receiving area adapted to receive a monitor; and a mounting device adapted to removably attach each of the plurality of interchangeable bases to the monitor to permit the monitor to be used with any one of the interchangeable bases, the plurality of interchangeable base units including a processing device having a different performance level for performing point-of sale operations, wherein the plurality of interchangeable bases are interchangeably connectable to a monitor based on performance requirements of the point-of-sale system.

8. The plurality of interchangeable bases for a point-of-sale system defined by claim 7, wherein at least one of the plurality of interchangeable bases is adapted to house a processing device.

9. The plurality of interchangeable bases for a point-of-sale system defined by claim 8, wherein the processing device comprises at least one of a computer, microprocessor, microcontroller, application specific integrated circuit (ASIC), and programmable logic device.

10. The plurality of interchangeable bases for a point-of-sale system defined by claim 7, wherein at least one of the plurality of interchangeable bases is adapted to house electrical connections associated with the monitor.

11. A method of displaying point-of-sale information comprising:

providing a first monitor;

providing a plurality of interchangeable bases, the plurality of interchangeable bases being adapted to receive the first monitor, the plurality of interchangeable bases being adapted to be selectively removable from the first monitor to permit the first monitor to be used with any one of the interchangeable bases, the plurality of interchangeable base units including a processing device having a different performance level for performing point-of sale operations, wherein the plurality of interchangeable bases are interchangeably connectable to a monitor based on performance requirements of the point-of-sale system;

disposing a processing device within each of the plurality of interchangeable bases;

disposing a radio frequency (RF) card reader within the housing, thereby eliminating electrical connections associated with the RF card reader that are external to the housing; and providing a second monitor, the second monitor being disposed on a rear portion of the first monitor.

12. The method of displaying point-of-sale information defined by claim 11, wherein the first monitor comprises a display and a receiving area and the method further comprising:

adapting each of the plurality of interchangeable bases to receive the receiving area; and adapting each of the plurality of interchangeable base to be selectively removable from the receiving area.

13. The method of displaying point-of-sale information defined by claim 11, further comprising providing the processing device as at least one of a computer, microprocessor, microcontroller, application specific integrated circuit (ASIC), and programmable logic device.

14. The method of displaying point-of-sale information defined by claim 11, further comprising adapting each of the plurality of interchangeable bases to house electrical connections associated with the RF card reader.

15. The method of displaying point-of-sale information defined by claim 11, further comprising coupling at least one of a magnetic strip reader (MSR), customer display, touch-screen display, speaker, fingerprint verifier, printer, bar code reader, cash drawer, keyboard, flash-based mass storage, disk drive mass storage, memory, Universal Synchronous Bus (USB) port, RS-232 port, SVGA port, Ethernet port, parallel port, PS/2 port, audio port, programmable cash drawer kick-out port, and mouse operatively to the processing device.

16. The method of displaying point-of-sale information defined by claim 11, wherein the second monitor comprises a customer display and the method further comprises positioning the RF card reader in proximity to the customer display, such that the RF card reader can be accessed while viewing the customer display.

* * * * *